United States Patent
Grayson et al.

(10) Patent No.: US 10,462,699 B2
(45) Date of Patent: Oct. 29, 2019

(54) SYSTEM AND METHOD FOR INTERNET PROTOCOL VERSION-BASED MULTIPLE ACCESS POINT NAME SUPPORT IN A NETWORK ENVIRONMENT

(71) Applicant: CISCO TECHNOLOGY, INC., San Jose, CA (US)

(72) Inventors: Mark Grayson, Maidenhead (GB); Srinath Gundavelli, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 423 days.

(21) Appl. No.: 14/480,284

(22) Filed: Sep. 8, 2014

(65) Prior Publication Data
US 2016/0073283 A1 Mar. 10, 2016

(51) Int. Cl.
| | |
|---|---|
| H04W 28/02 | (2009.01) |
| H04W 76/15 | (2018.01) |
| H04L 29/12 | (2006.01) |
| H04W 40/02 | (2009.01) |
| H04W 60/00 | (2009.01) |
| H04W 88/16 | (2009.01) |
| H04W 88/18 | (2009.01) |

(52) U.S. Cl.
CPC ..... *H04W 28/0215* (2013.01); *H04L 61/2007* (2013.01); *H04W 40/02* (2013.01); *H04W 60/00* (2013.01); *H04W 76/15* (2018.02); *H04L 61/6013* (2013.01); *H04L 61/6068* (2013.01); *H04W 88/16* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 6,483,820 | B1 | 11/2002 | Davidson et al. |
| 7,379,739 | B2 | 5/2008 | Rajkotia et al. |
| 7,983,667 | B2 | 7/2011 | Hart et al. |

(Continued)

FOREIGN PATENT DOCUMENTS

| | | |
|---|---|---|
| CN | 102378288 | 3/2012 |
| CN | 102857987 A | 1/2013 |

(Continued)

OTHER PUBLICATIONS

Adrangi, F., et al., "Chargeable User Identity," Network Working Group RFC 4372, Jan. 2006, 10 pages.

(Continued)

*Primary Examiner* — Yaotang Wang
(74) *Attorney, Agent, or Firm* — Patterson + Sheridan, LLP (57) ABSTRACT

An example method is provided in one example embodiment and may include receiving an attach trigger for a user equipment (UE) within a trusted access network; configuring a first signaling path for the UE for a first Internet protocol (IP) connection; and configuring a second signaling path for the UE for a second IP connection, wherein the first and second IP connections are associated with different IP version types. The method can include switching traffic for the UE between the first signaling path for the first IP connection and the second signaling path for the second IP connection based on IP version type of the traffic.

20 Claims, 6 Drawing Sheets

(56) References Cited

U.S. PATENT DOCUMENTS

| | | |
|---|---|---|
| 8,107,950 B2 | 1/2012 | Amerijoo et al. |
| 8,320,965 B2 | 11/2012 | Kwun |
| 8,340,711 B1 | 12/2012 | Glass et al. |
| 8,588,698 B2 | 11/2013 | Brisebois |
| 8,611,299 B2 | 12/2013 | Yang et al. |
| 8,639,243 B2 | 1/2014 | Radulescu et al. |
| 8,712,459 B2 | 4/2014 | Lim et al. |
| 8,792,886 B2 | 7/2014 | Meshkati |
| 8,830,936 B2 | 9/2014 | Ren |
| 8,917,658 B2 | 12/2014 | Bjork |
| 9,219,816 B2 | 12/2015 | Grayson et al. |
| 9,226,255 B2 | 12/2015 | Grayson et al. |
| 9,350,737 B2 | 5/2016 | Fernandez Alonso |
| 2005/0036462 A1 | 2/2005 | Sillasto et al. |
| 2006/0229087 A1 | 10/2006 | Davis et al. |
| 2007/0008885 A1 | 1/2007 | Bonner |
| 2009/0137246 A1 | 5/2009 | Xing |
| 2009/0305684 A1 | 12/2009 | Jones |
| 2010/0035578 A1* | 2/2010 | Ahmed ............... H04W 12/06 455/411 |
| 2010/0056184 A1 | 3/2010 | Vakil |
| 2010/0112982 A1 | 5/2010 | Singh et al. |
| 2010/0124929 A1 | 5/2010 | Lee |
| 2010/0135237 A1 | 6/2010 | Papasakellariou |
| 2010/0157922 A1 | 6/2010 | Kim et al. |
| 2010/0182955 A1 | 7/2010 | Bjork |
| 2010/0240314 A1 | 9/2010 | Chang |
| 2010/0260036 A1 | 10/2010 | Molnar et al. |
| 2010/0260068 A1 | 10/2010 | Bhatt et al. |
| 2010/0279628 A1 | 11/2010 | Love et al. |
| 2011/0110316 A1 | 5/2011 | Chen et al. |
| 2011/0128913 A1 | 6/2011 | Chowdhury |
| 2011/0130144 A1 | 6/2011 | Schein |
| 2011/0170481 A1 | 7/2011 | Gomes |
| 2011/0177817 A1 | 7/2011 | Hole |
| 2011/0201333 A1 | 8/2011 | Kwon |
| 2011/0211514 A1 | 9/2011 | Hamalainin |
| 2011/0237283 A1 | 9/2011 | Shan et al. |
| 2011/0267967 A1 | 11/2011 | Ratasuk |
| 2011/0314178 A1 | 12/2011 | Kanode |
| 2012/0004003 A1 | 1/2012 | Shaheen et al. |
| 2012/0015653 A1 | 1/2012 | Paliwal |
| 2012/0100849 A1 | 4/2012 | Marsico |
| 2012/0129537 A1 | 5/2012 | Liu et al. |
| 2012/0191842 A1 | 7/2012 | Hu et al. |
| 2012/0210003 A1 | 8/2012 | Castro |
| 2012/0258720 A1 | 10/2012 | Tinnakornsrisphap et al. |
| 2012/0260299 A1 | 10/2012 | Kotecha |
| 2012/0265888 A1 | 10/2012 | Roeland et al. |
| 2012/0269167 A1 | 10/2012 | Velev |
| 2012/0276913 A1 | 11/2012 | Lim |
| 2012/0290452 A1 | 11/2012 | Pancorbo Marcos |
| 2012/0327850 A1 | 12/2012 | Wang et al. |
| 2013/0003697 A1 | 1/2013 | Adjakple et al. |
| 2013/0041574 A1 | 2/2013 | Koshizen |
| 2013/0077482 A1 | 3/2013 | Krishna et al. |
| 2013/0114484 A1 | 5/2013 | Suzuki |
| 2013/0121322 A1* | 5/2013 | Salkintzis ............... H04W 76/12 370/338 |
| 2013/0132570 A1 | 5/2013 | Lopez Nieto |
| 2013/0136072 A1 | 5/2013 | Bachmann et al. |
| 2013/0139221 A1 | 5/2013 | Gundavelli |
| 2013/0155948 A1 | 6/2013 | Pinheiro |
| 2013/0155954 A1 | 6/2013 | Wang et al. |
| 2013/0163543 A1 | 6/2013 | Freda et al. |
| 2013/0166948 A1 | 6/2013 | Pinheiro |
| 2013/0182680 A1 | 7/2013 | Choi et al. |
| 2013/0210431 A1 | 8/2013 | Abe |
| 2013/0229945 A1 | 9/2013 | Cha et al. |
| 2013/0235759 A1 | 9/2013 | Meshkati |
| 2013/0294356 A1 | 11/2013 | Bala et al. |
| 2013/0308531 A1 | 11/2013 | So et al. |
| 2013/0326001 A1 | 12/2013 | Jorgensen et al. |
| 2013/0337769 A1 | 12/2013 | Bhatia |
| 2013/0337821 A1 | 12/2013 | Clegg |
| 2013/0339783 A1 | 12/2013 | Alonso et al. |
| 2013/0343288 A1 | 12/2013 | Ratasuk et al. |
| 2013/0343304 A1 | 12/2013 | Kaippallimalil et al. |
| 2014/0003225 A1 | 1/2014 | Mann et al. |
| 2014/0010086 A1 | 1/2014 | Etemad et al. |
| 2014/0011505 A1 | 1/2014 | Liao |
| 2014/0016629 A1 | 1/2014 | Pancorbo Marcos |
| 2014/0078986 A1 | 3/2014 | Kaippallimalil et al. |
| 2014/0086226 A1* | 3/2014 | Zhao ............... H04W 76/022 370/338 |
| 2014/0094139 A1 | 4/2014 | Xu |
| 2014/0112251 A1 | 4/2014 | Kim et al. |
| 2014/0126453 A1 | 5/2014 | Park |
| 2014/0146732 A1 | 5/2014 | Olufunmilola et al. |
| 2014/0155109 A1 | 6/2014 | Vaidya et al. |
| 2014/0177583 A1 | 6/2014 | Aso |
| 2014/0185537 A1 | 7/2014 | Papasakellariou |
| 2014/0241316 A1 | 8/2014 | Okmyanskiy et al. |
| 2014/0254367 A1 | 9/2014 | Jeong |
| 2014/0287759 A1 | 9/2014 | Purohit |
| 2014/0287769 A1 | 9/2014 | Taori |
| 2014/0297888 A1 | 10/2014 | McCann |
| 2014/0301351 A1 | 10/2014 | Gao |
| 2014/0307589 A1 | 10/2014 | Li |
| 2014/0321328 A1 | 10/2014 | Zuniga |
| 2014/0328266 A1 | 11/2014 | Yu |
| 2014/0341138 A1* | 11/2014 | Roeland ............... H04W 80/045 370/329 |
| 2014/0342745 A1 | 11/2014 | Bhushan |
| 2014/0378131 A1 | 12/2014 | Rui |
| 2015/0009826 A1 | 1/2015 | Ma |
| 2015/0044989 A1 | 2/2015 | De Foy |
| 2015/0055588 A1 | 2/2015 | Yerramalli et al. |
| 2015/0063101 A1 | 3/2015 | Touati |
| 2015/0103768 A1 | 4/2015 | Chen |
| 2015/0103772 A1* | 4/2015 | Carnero Ros ............ H04L 45/04 370/329 |
| 2015/0117347 A1* | 4/2015 | Iwai ............... H04W 76/041 370/329 |
| 2015/0146594 A1 | 5/2015 | Grayson |
| 2015/0172471 A1 | 6/2015 | Castro |
| 2015/0181577 A1 | 6/2015 | Moulsley |
| 2015/0200760 A1 | 7/2015 | Xia |
| 2015/0208403 A1 | 7/2015 | Takeda |
| 2015/0222634 A1 | 8/2015 | Ludwig |
| 2015/0245241 A1 | 8/2015 | Posz |
| 2015/0264652 A1 | 9/2015 | Zhang |
| 2015/0282026 A1* | 10/2015 | Gupta ............... H04W 88/08 370/331 |
| 2015/0296516 A1 | 10/2015 | Jung |
| 2015/0365931 A1 | 12/2015 | Ng et al. |
| 2015/0382386 A1 | 12/2015 | Castro Castro |
| 2016/0007170 A1 | 1/2016 | Vaidya et al. |
| 2016/0007316 A1 | 1/2016 | Vaidya et al. |
| 2016/0007378 A1 | 1/2016 | Bertorelle |
| 2016/0037490 A1 | 2/2016 | Pazhyannur et al. |
| 2016/0037550 A1 | 2/2016 | Barabell |
| 2016/0073282 A1 | 3/2016 | Speicher |
| 2016/0073285 A1 | 3/2016 | Graham et al. |
| 2016/0073328 A1 | 3/2016 | Li |
| 2016/0094976 A1 | 3/2016 | Enomoto |
| 2016/0099794 A1 | 4/2016 | Chendamari |
| 2016/0105882 A1 | 4/2016 | Park |
| 2016/0127137 A1 | 5/2016 | Fernandez Alonso |
| 2016/0134761 A1 | 5/2016 | Campbell et al. |
| 2016/0135143 A1 | 5/2016 | Won et al. |
| 2016/0156729 A1 | 6/2016 | Essigmann |
| 2016/0165494 A1 | 6/2016 | Warburton et al. |
| 2016/0191631 A1 | 6/2016 | Haraszti |
| 2016/0226669 A1 | 8/2016 | Livanos et al. |
| 2016/0227428 A1 | 8/2016 | Novlan et al. |
| 2016/0234706 A1 | 8/2016 | Liu et al. |
| 2016/0234763 A1 | 8/2016 | Um et al. |
| 2016/0242203 A1 | 8/2016 | You |
| 2016/0262041 A1 | 9/2016 | Ronneke |

(56) References Cited

U.S. PATENT DOCUMENTS

| | | | |
|---|---|---|---|
| 2016/0295357 A1 | 10/2016 | Grayson et al. | |
| 2016/0295521 A1 | 10/2016 | Grayson et al. | |

FOREIGN PATENT DOCUMENTS

| | | |
|---|---|---|
| CN | 105050072 A | 11/2015 |
| CN | 105307279 | 2/2016 |
| CN | 105407509 | 3/2016 |
| CN | 105407540 | 3/2016 |
| CN | 105592460 | 5/2016 |
| EP | 2234422 | 9/2010 |
| EP | 2453700 | 5/2012 |
| EP | 2466831 | 6/2012 |
| EP | 2757850 | 7/2014 |
| EP | 2981119 | 2/2016 |
| EP | 2993868 | 3/2016 |
| EP | 2996386 | 3/2016 |
| EP | 3029988 | 6/2016 |
| EP | 3046386 | 7/2016 |
| WO | WO2009/025601 | 2/2009 |
| WO | WO2011/002958 | 1/2011 |
| WO | WO2011/085238 | 7/2011 |
| WO | WO2011/134529 | 11/2011 |
| WO | WO2012/055984 | 5/2012 |
| WO | WO2012/135121 | 10/2012 |
| WO | WO2013/041574 | 3/2013 |
| WO | WO2013/082245 | 6/2013 |
| WO | WO2013/086659 | 6/2013 |
| WO | WO2013/169991 | 11/2013 |
| WO | WO2014/051606 | 4/2014 |
| WO | WO2014/177208 | 11/2014 |
| WO | WO2016/126413 | 8/2016 |
| WO | WO2016/126414 | 8/2016 |

OTHER PUBLICATIONS

"Paging Indicator Channel PICH Work in 3G," Teletopix.org, Telecom Techniques Guide, Feb. 13, 2014, 2 pages http://www.teletopix.org/3g-wcdma/paging-indicator-channel-pich-work-in-3g/.

"Paging Channel Selection," UMTS World; first published on or about Jun. 22, 2003; 3 pages http://www.umtsworld.com/technology/paging.html.

Holbrook, H., et al., "Source-Specific-Multicast for IP," Network Working Group RFC 4607, Aug. 2006.

Tayal, "All About PDCCH and CCE Allocation—PDCCH (Physical downlink Control Channel)," Tayal's Way to Learn LTE, May 2013; 14 pages http://nitintayal-lte-tutorials.blogspot.com/2013/03/all-about-pdcch-and-ccc-allocation.html.

"PDCCH Processing," published by Gio Zakradze on Dec. 29, 2014; 56 pages.

"ETSI TS 123 401 V9.5.0 (Jun. 2010) Technical Specification: LTE; General Packet Radio Service (GPRS) enhancements for Evolved Universal Terrestrial Radio Access Network (E-UTRAN) access (3GPP TS 23.401 version 9.5.0 Release 9)," ETSI, 650 Route des Lucioles, F-06921, Sophia Antipolis Cedex—France, Jun. 2010; See Section 4, pp. 15-46.

"ETSI TS 123 402 V9.8.0 (Mar. 2011) Technical Specification: Universal Mobile Telecommunications System (UMTS); LTE; Architecture enhancements for non-3GPP accesses (3GPP TS 23.402 version 9.8.0 Release 9)," ETSI, 650 Route des Lucioles, F-06921, Sophia Antipolis Cedex—France, Mar. 2011; See Section 4-6, pp. 14-116.

"ETSI TS 125 211 V11.5.0 (Jul. 2014) Technical Specification: Universal Mobile Telecommunications System (UMTS); Physical channels and mapping of transport channels onto physical channels (FDD) (3GPP TS 25.211 version 11.5.0 Release 11)," [Relevant Section 7 only]; ETSI, 650 Route des Lucioles, F-06921, Sophia Antipolis Cedex—France, Jul. 2014.

"ETSI TS 123 401 V11.10.0 (Jul. 2014) Technical Specification: LTE; General Packet Radio Service (GPRS) enhancements for Evolved Universal Terrestrial Radio Access Network (E-UTRAN) access (3GPP TS 23.401 version 11.10.0 Release 11)," [Relevant Sections 5.3.1.2 and 5.3.4.3 only]; ETSI, 650 Route des Lucioles, F-06921, Sophia Antipolis Cedex—France, Jul. 2014.

"3GPP TS 23.682 V12.2.0 (Jun. 2014) Technical Specification: 3rd Generation Partnership Project; Technical Specification Group Services and System Aspects; Architecture enhancements to facilitate communications with packet data networks and applications (Release 12)," 3rd Generation Partnership Project; Jun. 2014.

"3GPP TS 36.413 V12.3.0 (Sep. 2014) Technical Specification: 3rd Generation Partnership Project; Technical Specification Group Radio Access Network; Evolved Universal Terrestrial Radio Access Network (E-UTRAN); S1 Application Protocol (S1AP) (Release 12)," [Relevant Sections 9.1.6 and 9.2.3.13 only]; 3rd Generation Partnership Project, Sep. 2014.

"3GPP TS 36.300 V12.3.0 (Sep. 2014) Technical Specification: 3rd Generation Partnership Project; Technical Specification Group Radio Access Network; Evolved Universal Terrestrial Radio Access (E-UTRA) and Evolved Universal Terrestrial Radio Access Network 9E-UTRAN); Overall description; Stage 2 (Release 12)," [Relevant Sections 15 and 23 only]; 3rd Generation Partnership Project; Sep. 2014.

"ETSI TS 136 331 V12.3.0 (Sep. 2014) Technical Specificaton: LTE; Evolved Universal Terrestrial Radio Access (E-UTRA); Radio Resource Control (RRC); Protocol specification (3GPP TS 36.311 version 12.3.0 Release 12)," [Relevant Section 5.3.2 only]; ETSI, 650 Route des Lucioles, F-06921, Sophia Antipolis Cedex—France, Sep. 2014.

"3GPP TS23.002 V12.5.0 (Jun. 2014) Technical Specification: 3rd Generation Partnership Project; Technical Specification Group Services and System Aspects; Network architecture (Release 12)," 3GPP, 650 Route des Lucioles, F-06921, Sophia Antipolis Cedex—France, Jun. 2014; See Sections 1-5, pp. 11-76.

"ETSI TS 136 133 V12.5.0 (Nov. 2014) Technical Specification: LTE; Evolved Universal Terrestrial Radio Access (E-UTRA); Requirements for support of radio resource management (3GPP TS 36.133 version 12.5.0 Release 12)," [Relevant Sections 8-10 only]; ETSI, 650 Route des Lucioles, F-06921, Sophia Antipolis Cedex—France, Nov. 2014.

"3GPP TS 29-272 V12-6-0 (Sep. 2014) Technical Specification: 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release12)," [Relevant Sections 5 and 7.3.1-7.3.21 only]; 3rd Generation Partnership Project; Sep. 2014.

"3GPP TS 29-274 V12-6-0 (Sep. 2014) Technical Specification: 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 12)," [Relevant Sections 4-6; 7.1-7.2.15; and 8.1-8.21.6 only]; 3rd Generation Partnership Project; Sep. 2014.

"3GPP TS 29.212 V12.5.2 (Jul. 2014) Technical Specification: 3rd Generation Partnership Project; Technical Specification Group Core Network and Terminals; Policy and Charging Control (PCC); Reference Points (Release 12)," 3GPP, 650 Route des Lucioles, F-06921, Sophia Antipolis Cedex—France, Jul. 2014; Section 4, pp. 17-88.

"3GPP TR23.705 V0.11.0 (May 2014) Technical Report: 3rd Generation Partnership Project; Technical Specification Group Services and System Aspects; Study on system enhancements for user plane congestion management (Release 13)," 3GPP, 650 Route des Lucioles, F-06921, Sophia Antipolis Cedex—France, May 2014, 64 pages.

"3GPP TS 23.887 V12.0.0 (Dec. 2013) Technical Report: 3rd Generation Partnership Project; Technical Specification Group Services and System Aspects; Study on Machine-Type Communications (MTC) and other mobile data applications communications enhancements (Release 12)," 3rd Generation Partnership Project; Dec. 2013.

"3GPP TS 23.060 V13.0.0 (Sep. 2014) Technical Specification: 3rd Generation Partnership Project; Technical Specification Group Services and System Aspects; General Packet Radio Service (GPRS);

(56) References Cited

OTHER PUBLICATIONS

Service description; Stage 2 (Release 13)," [Relevant Sections 5.3.20 and 6.2.3 only]; 3rd Generation Partnership Project; Sep. 2014.
"3GPP TS 22.368 V13.0.0 (Jun. 2014) Technical Specification: 3rd Generation Partnership Project; Technical Specification Group Services and System Aspects; Service requirements for Machine-Type Communications (MTC); Stage 1 (Release 13)," 3rd Generation Partnership Project; Jun. 2014.
"PDCCH Construction, Expert Opinion," posted by Hongyan on May 20, 2011; LTE University, 4 pages http://lteuniversity.com/get_trained/expert_opinion1/b/hongyanlei/archive/2011/05/20/pdcch-construction.aspx.
"GSMA LTE Roaming Guidelines, Version 9.0," GSM Association, Official Document IR88, Jan. 24, 2013; 53 pages.
Guttman, E., et al., "Service Location Protocol, Version 2," Network Working Group RFC 2608, Jun. 1999, 57 pages.
"3GPP TS 23.203 V13.1.0 (Sep. 2014) Technical Specification: 3rd Generation Partnership Project; Technical Specification Group Services and System Aspects; Policy and charging control architecture (Release 13)," [Relevant Sections 1-6 only]; 3rd Generation Partnership Project, Sep. 2014.
"3GPP TS 32.522 v11.2.0, 3rd Generation Partnership Project Technical Specification: Group Services and System Aspects; Telecommunication management; Self-Organizing Networks (SON) Policy Network Resource Model (NRM) Integration Reference Point (IRP); Information Service (IS) (Release 11)," 3GPP, 650 Route des Lucioles, F-06921 Sophia Antipolis Valbonne, France, Jun. 2012, 35 pages.
3GPP TSG-RAN WG3 #61bis, R3-081174, "Solution for interference reduction SON use case," Orange, Alcatel-Lucent, Agenda Item 10.1.1c; Kansas City, MO, USA; 6 pages.
3GPP-TSG-RAN WG3 Meeting #60, R3-081123, "Dynamic Setup of HNBs for Energy Savings and Interference Reduction," Mitsubishi Electric, Agenda Item 10.1.1c; Kansas City, MO USA, May 5-9, 2008; 6 pages.
3GPP-TSG-RAN3 #59, R3-080082, "Capacity and Coverage SON Use Case," Alcatel-Lucent, Agenda Item 10.1.1.c; Sorrento, Italy, Feb. 11-15, 2008; 4 pages.
"ETSI TS 123 007 V12.6.0 (Oct. 2014) Technical Specification: Digital Cellular Telecommunications System (Phase 2+); Universal Mobile Telecommunications System (UMTS); LTE; Restoration procedures (EGPP TS 23.007 version 12.6.0 Release 12)," ETSI, 650 Route des Lucioles, F-06921, Sophia Antipolis Cedex—France, Oct. 2014; 93 pages.
"ETSI TS 123 401 V12.6.0 (Sep. 2014) Technical Specification: LTE; General Packet Radio Service (GPRS) enhancements for Evolved Universal Terrestrial Radio Access Network (E-UTRAN) access (3GPP TS 23.401 version 12.6.0 Release 12)," ETSI, 650 Route des Lucioles, F-06921, Sophia Antipolis Cedex—France, Sep. 2014; 308 pages.
"ETSI TS 129 061 V12.7.0 (Oct. 2014) Technical Specification: Digital cellular telecommunications system (Phase 2+); Universal Mobile Telecommunications System (UMTS); LTE; Interworking between the Public Land Mobile Network (PLMN) supporting packet based services and Packet Data Networks (PDN) (3GPP TS 29.061 version 12.7.0 Release 12)," ETSI, 650 Route des Lucioles, F-06921, Sophia Antipolis Cedex—France, Oct. 2014; 170 pages.
"ETSI TS 129 212 V12.6.0 (Oct. 2014) Technical Specification: Universal Mobile Telecommunications System (UMTS); LTE; Policy and Charging Control (PCC); Reference Points (3GPP TS 29.212 version 12.6.0 Release 12)," ETSI, 650 Route des Lucioles, F-06921, Sophia Antipolis Cedex—France, Oct. 2014; 232 pages.
"ETSI TS 129 213 V12.5.0 (Oct. 2014) Technical Specification: Digital Cellular Telecommunications System (Phase 2+); Universal Mobile Telecommunications System (UMTS); LTE; Policy and charging control signalling flows and Quality of Service (QoS) parameter mapping (3GPP TS 29.213 version 12.5.0 Release 12)," [Relevant Sections 3, 4, 8 and 8 only], ETSI, 650 Route des Lucioles, F-06921, Sophia Antipolis Cedex—France, Oct. 2014.

"ETSI TS 129 214 V12.5.0 (Oct. 2014) Technical Specification: Universal Mobile Telecommunications System (UMTS); LTE; Policy and charging control over Rx reference point (3GPP TS 29.214 version 12.5.0 Release 12)," ETSI, 650 Route des Lucioles, F-06921, Sophia Antipolis Cedex—France, Oct. 2014; 64 pages.
"ETSI TS 125 331 V11.10.0 (Jul. 2014) Technical Specification: Universal Mobile Telecommunications System (UMTS); Radio Resource Control (RRC); Protocol Specification," ETSI, 650 Route des Lucioles, F-06921, Sophia Antipolis Cedex—France, Jul. 2014, © European Telecommunications Standards Institute 2014. All Rights Reserved. [Relevant Portions: §7.2.2 pp. 55-58; §8.1.2 pp. 105-108; §8.1.4 pp. 126-129; §8.3.1 pp. 215-260; §8.3.8-8.3.9 pp. 289-292; §8.5.21 pp. 357-365; §10.2.7 pp. 620-623; Annex B.3 pp. 2045-2052].
"ETSI TS 125 469 V11.2.0 (Apr. 2013) Technical Specification: Universal Mobile Telecommunications System (UMTS); UTRAN Iuh interface Home Node B (HNB) Application Part (HNBAP) signaling (3GPP TS 25.469 version 11.2.0 Release 11)," © European Telecommunications Standards Institute 2013; Apr. 2013; 78 pages.
"ETSI TS 125 469 V9.3.0 (Oct. 2010) Technical Specification: Universal Mobile Telecommunications System (UMTS); UTRAN Iuh interface Home Node B (HNG) Application Part (HNBAP) signaling (3GPP TS 25.469 version 9.3.0 Release 9)," © European Telecommunications Standards Institute 2010; Oct. 2010; 64 pages.
"ETSI TS 123 401 V12.70 (Jan. 2015) Technical Specification: LTE; General Packet Radio Service (GPRS) enhancements for Evolved Universal Terrestrial Radio Access Network (E-UTRAN) access (EGPP TS 23.401 version 12.7.0 Release 12)," Section 4 only, European Telecommunications Standards Institute, 650 Routs des Lucioles, F-06921 Sophia Antipolis Cedex, France; Jan. 2015; 77 pages.
"ETSI TS 125 367 V9.4.0, Universal Mobile Telecommunications System (UMTS); Mobility procedures for Home Node B (HNB); Overall description; Stage 2 (3GPP TS25.367 version 9.4.0 Release 9)", European Telecommunications Standards Institute, 650 Route des Lucioles, F-06921 Sophia Antipolis Cedex, France, Jun. 2010; 17 pages.
"LTE Quick Reference: Resource Allocation and Management Unit,""LTE Handbook, Share Technote, first published on or about Jul. 13, 2012 http://www.sharetechnote.com/html/Handbook_LTE_ResourceAllocation_ManagementUnit.html;".
"Broadband Forum Technical Report: TR-196 Femto Access Point Service Data Model," Issue: 1, Issue Date: Apr. 2009, © The Broadband Forum; 131 pages.
Broadband Forum, "TR-069 CPE WAN Management Protocol," Broadband Forum Technical Report, Issue: 1 Amendment 4, Issue Date: Jul. 2011, Protocol Version 1.3, © The Broadband Forum. All Rights Reserved; 190 pages.
Broadband Forum, "TR-196 Femto Access Point Service Data Model," Broadband Forum Technical Report, Issue 2, Issue Date: Nov. 2011, © The Broadband Forum. All Rights Reserved; 46 pages.
"Cisco Licensed Small Cell Solution: Reduce Costs, Improve Coverage and Capacity—Solution Overview," Cisco Systems, Inc., C22-726686-00, Feb. 2013, © 2013 Cisco and/or its affiliates. All Rights Reserved. Printed in USA, 13 pages.
"Extensible Authentication Protocol," Wikipedia, the free encyclopedia, Sep. 16, 2013, 10 pages http://en.wikipedia.org/wiki/Extensible_Authentication_Protocol#EAP-FAST.
"Link Layer Discovery Protocol," Wikipedia, the free encyclopedia, Sep. 25, 2013, 4 pages, http://en.wikipedia.org/wiki/Link_Layer_Discovery_Protocol.
"RADIUS," Wikipedia, the free encyclopedia, Sep. 26, 2013, 12 pages http://en.wikipedia.org/wiki/RADIUS.
Ashraf, Imran, "Distributed Radio Coverage Optimization in Enterprise Femtocell Networks," International Conference on Communications ICC 2010, May 23-27, 2010, Cape Town, South Africa; 6 pages.
Calhoun, P., "Diameter Base Protocol," Network Working Group RFC 3588, Sep. 2003; 147 pages.

(56) References Cited

OTHER PUBLICATIONS

Claussen, Holger, et al., "Self-optimization of Coverage for Femtocell Deployments," DOI 10:10.1109/WTS2008 Wireless Telecommunications Symposium, Apr. 26-28, 2008; Pomona, CA; 8 pages.
Haverinen, H., "Extensible Authentication Protocol Method for Global System for Mobile Communications (GSM) Subscriber Identity Modules (EAP-SIM)," Network Working Group RFC 4186, Jan. 2006, 93 pages.
Horn, Gavin, "3GPP Femtocells: Architecture and Protocols," Qualcomm Incorporated, 5775 Morehouse Drive, San Diego, CA, Sep. 2010; 64 pages.
Nivaggioli, Patrice, "Cisco Small Cell Architecture," Cisco Connect, Dubrovnik, Croatia, South East Europe, May 20-22, 2013, © 2012 Cisco and/or its affiliates. All Rights Reserved.; 40 pages.
EPO Dec. 15, 2015 Extended Search Report and Written Opinion from European Application Serial No. 15178914.6.
Ratasuk, Rapeepat, et al., "License-exempt LTE Deployment in Heterogeneous Network," 2012 International Symposium on Wireless Communications Systems (ISWCS), Aug. 28, 2012, pp. 246-250.
Almeida, Erika, et al., "Enabling LTE/Wifi Coexistence by LTE Blank Subframe Allocation," 2013 IEEE International Conference on Communications (ICC), Jun. 9, 2013, pp. 5083-5088.
Saad, Sawsan A., et al., "A Survey on Power Control Techniques in Femtocell Networks," Journal of Communications vol. 8, No. 12, Dec. 2013; 10 pages.
EPO Feb. 8, 2016 Extended Search Report and Written Opinion from European Application Serial No. 15183583.2.
3GPP TSG-RAN WG3 Meeting #73bis R3-112481, "Issues Related to Cell RACH Support for HNB Handover," Alcatel-Lucent, 3GPP Draft, Zhuhai, China, Oct. 10-14, 2011; 10 pages.
3GPP TSG-RAN3 Meeting #69 R3-102094, "Text Proposal for HNBRAP," Alcatel-Lucent, 3GPP Draft, Madrid, Spain, Aug. 23-27, 2010; 62 pages.
U.S. Appl. No. 14/534,792, filed Nov. 6, 2014, entitled "System and Method for Providing Message Delivery and Paging to a Group of Users in a Network Environment," Inventors: Maulik Vijay Vaidya, et al.
U.S. Appl. No. 14/450,040, filed Aug. 1, 2014, entitled "System and Method for Media Access Control Scheduler for a Long Term Evolution Unlicensed Network Environment," Inventors: Rajesh S. Pazhyannur, et al.
U.S. Appl. No. 14/481,654, filed Sep. 9, 2014, entitled "System and Method for Supporting Cell Updates Within Small Cell Cluster for Mobility in Cell Paging Channel Mode," Inventors: Mickael Graham, et al.
U.S. Appl. No. 14/536,642, filed Nov. 9, 2014, entitled "System and Method for Radio Aware Traffic Management Based Wireless Authorization," Inventors: Ian McDowell Campbell, et al.
U.S. Appl. No. 14/534,883, filed Nov. 6, 2014, entitled "System and Method for Providing Message Delivery and Paging to a Group of Users in a Network Environment," Inventors: Maulik Vijay Vaidya, et al.
U.S. Appl. No. 14/612,794, filed Feb. 3, 2015, entitled "System and Method for Providing Collaborative Neighbor Management in a Network Environment," Inventors: Nigel Edward Warburton, et al.
U.S. Appl. No. 14/597,036, filed Jan. 14, 2015, entitled "System and Method for Providing Collision-Avoided Physical Downlink Control Channel Resource Allocation in a Network Environment," Inventors: Qing Zhao, et al.
U.S. Appl. No. 14/612,827, filed Feb. 3, 2015, entitled "System and Method for Providing Policy Charging and Rules Function Discovery in a Network Environment," Inventors: Konstantin Livanos, et al.
U.S. Appl. No. 14/614,500, filed Feb. 5, 2015, entitled "System and Method for Providing Policy Charging and Rules Function Discovery in a Network Environment," Inventors: Konstantin Livanos, et al.
"3GPP TR 23.852 (V12.0.0 (Sep. 2013) Technical Report: $3^{rd}$ Generational Partnership Project; Technical Specification Group Services and System Aspects; Study on S2a Mobility based on GPRS Tunnelling Protocol (GTP) and Wireless Local Area Network (WLAN) access to the Enhanced Packet Core (EPC) network (SaMOG); Stage 2 (Release 12);" $3^{rd}$ Generation Partnership Project (3GPP), Sep. 2013, 157 pages.
Drome, R., "Dynamic Host Configuration Protocol," Network Working Group RFC 2131, Mar. 1997; 45 pages.
Leung, K., et al., "WiMAX Forum/3GPP2 Proxy Mobile IPv4," Independent Submission RFC 5563, Feb. 2010; 41 pages.
Narten, T., et al., "Neighbor Discovery for IP version 6 (IPv6)," Network Working Group RFC 4861, Sep. 2007; 97 pages.
"LTE Quick Reference: CCE Index Calculation," LTE Handbook, Share Technote, http://www.sharetechnote.com/html/Handbook_LTE_CCE+Index.html First published on or about Jul. 8, 2012.
EPO Jan. 29, 2016 Extended Search Report and Written Opinion from European Application Serial No. 15180616.
Gundavelli, M., et al., "Multiple APN Support for Trusted Wireless LAN Access," NETEXT-WG Internet Draft, draft-gundavelli-netext-multiple-apn-pmipv6-01.txt, Feb. 22, 2012; 15 pages.
"3GPP TS 23.402 V12.5.0 (Jun. 2014) Technical Specification: 3rd Generation Partnership Project; Technical Specification Group Services and System Aspects; Architecture enhancements for non-3GPP accesses (Release 12);" 3GPP, 650 Route des Lucioles; F-05921 Sophia-Antipolis Cedex, France; Jun. 2014; 291 pages.
SA-WG2 Meeting #92, S2-123194 (Revision of Sw-122735), Juniper Networks, Barcelona, Spain, Jul. 9-13, 2012; 13 pages.
EPO Mar. 11, 2016 Extended Search Report and Written Opinion from European Application Serial No. 15193713.
"3GPP TS 23.203 V7.3.0 (Jun. 1, 2007) Technical Specification: 3rd Generation Partnership Project; Group Services and System Aspects; Policy and charging control architecture (Release 7)," 3GPP, 650 Route des Lucioles; F-05921 Sophia-Antipolis Cedex, France; Jun. 1, 2007.
PCT Apr. 6, 2016 International Search Report and Written Opinion of the International Searching Authority from International Application No. PCT/US2016/013931.
"3GPP TS 29.213 V13.0.0 (Jan. 5, 2015) Technical Specification: 3rd Generation Partnership Project; Technical Specification Group Core Network and Terminals; Policy and Charging Control signalling flows and Quality of Service (QoS) parameter mapping (Release 13)," 3GPP, 650 Route des Lucioles; F-05921 Sophia-Antipolis Cedex, France; Jan. 5, 2015.
PCT Apr. 6, 2016 International Search Report and Written Opinion of the International Searching Authority from International Application No. PCT/US2016/013934.
3GPP TSG-CT WG3 Meeting #80, C3-150092, 29.213 CR0593, 3GPP Draft; Current Version 13.0.0; Huawei, et al.; Sorrento, Italy Feb. 2-6, 2015.
EPO Apr. 28, 2016 Extended Search Report and Written Opinion from European Application Serial No. 15195895.
EPO Jun. 7, 2016 Extended Search Report and Written Opinion from European Application Serial No. 16150351.
"Cisco ASR 5000 Series Small Cell Gateway," Cisco White Paper, C11-711704-00, Jul. 2012, Cisco Systems, Inc., Printed in USA, © 2012 Cisco and/or its affiliates. All Rights Reserved. 6 pages.
"Cisco EnergyWise Management Suite—Data Sheet," Cisco Systems, Inc., C78-729774-00, Oct. 2013 © 2013 Cisco and/or its affiliates. All Rights Reserved. Printed in USA, 4 pages.
Chinese Office Action for Application No. 201510563987.2 dated Apr. 2, 2018.

* cited by examiner

SYSTEM AND METHOD FOR INTERNET PROTOCOL VERSION-BASED MULTIPLE ACCESS POINT NAME SUPPORT IN A NETWORK ENVIRONMENT

TECHNICAL FIELD

This disclosure relates in general to the field of communications and, more particularly, to a system and method for Internet protocol (IP) version-based multiple access point name (APN) support in a network environment for a 3rd Generation Partnership Project (3GPP) system architecture.

BACKGROUND

Networking architectures have grown increasingly complex in communication environments. Mobile communication networks have grown substantially in subscriber base as end users become increasingly connected to mobile wireless environments. As the number of mobile subscribers increases, efficient management of communication resources becomes more critical. In some instances, network service providers desire to offload certain mobile communications to a trusted wireless local area network (WLAN), in order to reduce congestion in a network or in some cases to provide differentiated services to subscribers. However, there are significant challenges in managing IP connectivity via a trusted WLAN access network, particularly in the context of providing multiple packet data network (PDN) support for user equipment (UE) accessing multiple PDNs via the trusted WLAN access network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method for a communication network is provided in one example embodiment and may include receiving an attach trigger for a user equipment (UE) within a trusted access network; configuring a first signaling path for the UE for a first Internet protocol (IP) connection; and configuring a second signaling path for the UE for a second IP connection, wherein the first and second IP connections are associated with different IP version types.

In some instances the first IP connection can be associated with a first packet data network (PDN) connection for a first access point name (APN) and the second IP connection can be associated with a second PDN for a second APN. In some instances, the first signaling path or the second signaling path can be configured for at least one of: an IP version 4 (IPv4) packet data network (PDN) connection using an S2a signaling interface; and an IP version 6 (IPv6) PDN connection using an S2a signaling interface.

In other instances, the first IP connection can be associated with an IPv4 non-seamless wireless offload (NSWO) connection within the trusted access network and the second IP connection can be associated with IPv6 PDN connection via a 3GPP network with an IPv6 APN. In still other instances, the first IP PDN connection can be associated with an IPv6 NSWO connection within the trusted access network and the second IP connection can be associated with an IPv4 PDN connection via a 3GPP network with an IPv4 APN.

In some cases, the method can include configuring a subscriber profile for a subscriber associated with the UE, which can identify the first IP connection and the second IP connection for the subscriber; and loading the subscriber profile for the subscriber upon receiving the attach trigger for the UE. In still other cases, the method can include switching traffic for the UE between the first signaling path configured for the first IP connection and the second signaling path configured for the second IP connection based on IP version type of the traffic.

EXAMPLE EMBODIMENTS

Figure 1:
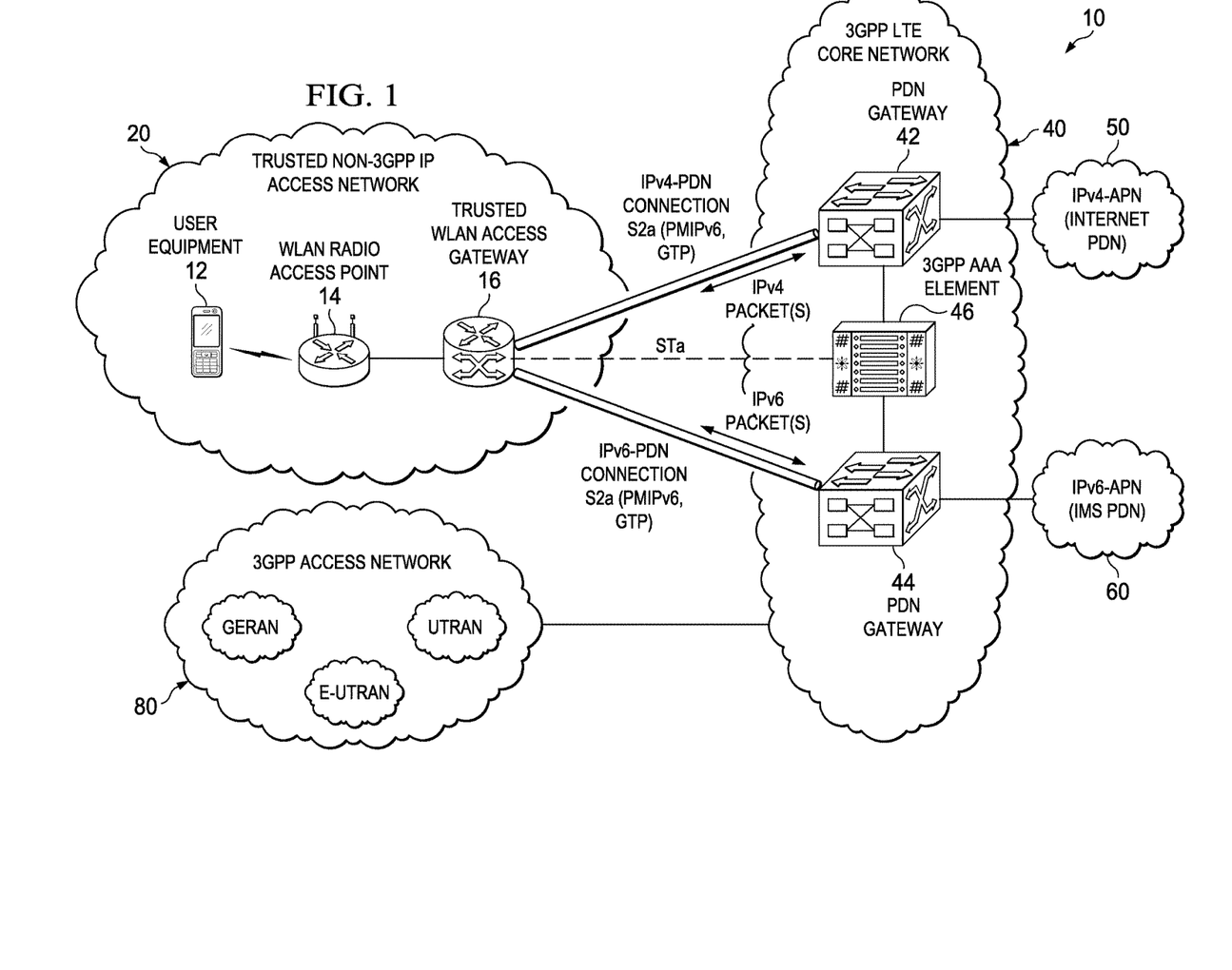
FIG. 1 is a simplified block diagram illustrating a communication system to facilitate providing IP version-based multiple APN support in a network environment according to one embodiment of the present disclosure.

Turning to FIG. 1, FIG. 1 is a simplified block diagram illustrating a communication system 10 to facilitate providing IP version-based multiple APN (multi-APN) support in a network environment according to one embodiment of the present disclosure. This particular configuration may be tied to the 3rd Generation Partnership Project (3GPP) Evolved Packet System (EPS) architecture, also sometimes referred to as the Long Term Evolution (LTE) EPS architecture. Alternatively, the depicted architecture may be applicable to other environments equally.

The example architecture of FIG. 1 may include user equipment (UE) 12, a trusted non-3GPP Internet protocol (IP) access network 20, which may include a Wireless Local Access Network (WLAN) radio access point 14 and a trusted WLAN access gateway (TWAG) 16. Also shown in FIG. 1 is a 3GPP LTE core network 40, which may include packet data network (PDN) gateways 42, 44 and a 3GPP Authentication, Authorization and Accounting (AAA) element 46. TWAG 16 may be in communication with 3GPP AAA element 46 via a DIAMETER-based STa signaling interface. PDN gateway (PGW) 42 may interface with an IP version 4 (IPv4) access point name (APN) 50. In various embodiments, IPv4-APN 50 can be implemented as an internet PDN or other similar IPv4 PDN. PGW 44 may interface with an IP version 6 (IPv6) APN 60. In various embodiments, IPv6-APN 60 can be implemented an Internet Multimedia Subsystem (IMS) PDN or other similar IPv6 PDN.

TWAG 16 may interface with each of PGW 42 and PGW using a corresponding S2a signaling interface. Each S2a signaling interface may support Proxy Mobile Internet protocol (PMIP) (version 4 and/or version 6) and/or General Packet Radio Service (GPRS) Tunneling Protocol (GTP) (version 1 and/or version 2). Although the S2a signaling interfaces shown in FIG. 1 are illustrated as providing connections for a particular IP version type (e.g., IPv4 for the S2a interface between TWAG 16 and PGW 42 and IPv6 for the S2a signaling interface between TWAG 16 and PGW 44), it should be understood that these version types may be reversed or changed based on particular configuration needs. In various embodiments, a Mobile Access Gateway (MAG) or a Proxy Mobile Agent (PMA) may be implemented for TWAG 16 to interface with PGWs 42, 44. A MAG can support PMIPv6 based S2a signaling and can also support PMIPv4 based S2a signaling.

Each of the remaining elements and access networks of FIG. 1 may interface to one another through simple interfaces (as illustrated) or through any other suitable connection (wired or wireless), which may provide a viable pathway for network communications. For example, communication system 10 may include a configuration capable of transmission control protocol/Internet protocol (TCP/IP) communications for the transmission or reception of packets in a network. Communication system 10 may also operate in conjunction with a user datagram protocol/IP (UDP/IP) or any other suitable protocol where appropriate and based on particular needs. Additionally, any one or more of these elements may be combined or removed from the architecture based on particular configuration needs.

3GPP LTE core network 40 may include other elements such as one or more Policy and Charging Rules Functions (PCRFs), a Home Subscriber Server/Home Location Register (HSS/HLR), etc. to provide connectivity for UE 12 to external PDNs via a 3GPP access network 80. These elements are not shown in order to illustrate other features of communication system 10. 3GPP access network 80 can include access networks such as GSM EDGE radio access network (GERAN), a UMTS terrestrial radio access network (UTRAN), generally referred to as 3G, and/or a LTE access network such as evolved UTRAN (E-UTRAN), generally referred to as 4G or LTE/LTE-Advanced (LTE-A). 3GPP access network 80 can also include one or more Node Bs (NodeBs), one or more Radio Network Controllers (RNCs) and one or more Serving General Packet Radio Service (GPRS) Support Nodes (SGSNs) to interface with 3GPP LTE core network 40 in order to provide GERAN and/or UTRAN coverage as well as one or more evolved NodeBs (eNodeBs), one or more Mobility Management Entities (MMEs) and one or more serving gateways (SGWs) to interface with 3GPP LTE core network 40 in order to provide E-UTRAN coverage for the 3GPP access network. These network elements are also not shown in FIG. 1 in order to illustrate other features of communication system 10. 3GPP access network 80 may be generally referred to as an LTE access network. 3GPP LTE core network 40, 3GPP access network 80 and various network elements contained therein such as, for example, MMEs, SGWs, PGWs, SGSNs, PCRFs and an HSS/HLR, etc. may be collectively be referred to as an Evolved Packet Core (EPC).

Before detailing some of the operational aspects of FIG. 1, it is important to understand common characteristics of interworking between WLANs and LTE access networks as generally operated in commercial architectures. The following foundation is offered earnestly for teaching purposes only and, therefore should not be construed in any way to limit the broad teachings of the present disclosure. 3GPP Release 11 (Rel-11) defines interworking between WLANs and LTE access systems for S2a Mobility Based on GTP (SaMOG). As defined in Rel-11 a UE can potentially attach to the EPC over a trusted WLAN access network (TWAN) and obtain the IP address configuration from the mobile network. Rel-11 assumes there are no changes to the UE and the support is limited to a single concurrent PDN/APN. This limitation is primarily due to a UE's inability to obtain multiple IPv4 addresses using Dynamic Host Configuration Protocol (DHCP) on a WLAN interface and due to other gaps in the UE data plane. Another limitation is the inability of the UE to signal an APN and hence this needs to be chosen by the network, e.g., based on subscription information.

If a chosen APN is, for example, an IMS APN/PDN, the UE will have an IP address from the IMS PDN and will be able to access the IMS fabric. However, the UE will not be able to access any other applications other than the IMS application. The UE will not be able to even activate a non-seamless wireless offload (NSWO) connection concurrently. If the chosen APN is a non-IMS APN/PDN, say, for example, a default APN, the UE will have an IP address from that specific PDN, but it will not be able to use only an IMS application. A key driver for WLAN-LTE seamless mobility is the IMS application, but that application cannot be used in Rel-11 concurrently with other applications. The IMS application can provide, among other things, voice over LTE (VoLTE) capabilities for UE as well as other enhanced services.

3GPP Rel-12 is working on defining extensions for multi-PDN support, however, these definitions can have significant impacts to UE. For example, the Rel-12 extensions for multi-PDN support require a new control plane between UE and the TWAG based on WLAN Control Protocol (WLCP) and require a new data plane between UE and the TWAG based on Virtual Media Access Control (VMAC) address. Given these multi-PDN complexities, some UE vendors are reluctant to invest in a Rel-12 solution. Moreover, it may be many years before a Rel-12 solution is available throughout the UE eco-system given the complexity and the changes to UE. Some vendors also appear to be focusing on unlicensed LTE solutions (e.g., LTE-U) and do not seem to be interested in enabling multi-PDN support. Accordingly, a solution is needed that does not require a Rel-12 update for UE.

In accordance with one embodiment, communication system 10 can overcome the aforementioned shortcomings (and others) by providing an enhanced TWAG 16 in trusted non-3GPP IP access network 20 to establish PDN connections with multiple APNs, but use different PDN types for the PDN connections on an IP version basis. For example, an IPv4 address can be provided for an IPv4-PDN connection over the S2a signaling interface between TWAG 16 for transporting IPv4 packets. In various embodiments, the IPv4 address can also be provided for an NSWO connection, or from a default APN (e.g., IPv4-APN 50). In various embodiments, the IPv4 address can be obtained over DHCP from IPv4-APN 50. Thus, IPv4 applications can be bound to an IPv4 PDN (e.g., IPv4-APN 50 or an NSWO connection). Separately, an IPv6 prefix can be provided over Routing Advertisements for an IPv6-PDN connection over the S2a signaling interface between TWAG 16 and PGW 44 for transporting IPv6 packets. In various embodiments, an IPv6 prefix can also be provided for an NSWO connection in trusted non-3GPP IP access network 20. Thus, IPv6 applications can be bound to an IPv6 PDN (e.g., IPv6-APN 60 or an NSWO). In various embodiments, the IPv6 prefix can be from IPv6-APN 60 (e.g., IMS PDN). The TWAG can send a Router Advertisement (RA) with the IPv6 prefix from the IPv6-APN (e.g., IMS PDN) and may offer the IPv4 address over DHCP that was received from the IPv4-APN.

To illustrate features of communication system 10, consider an example involving a given UE (e.g., UE 12) and enhanced TWAG 16. For the present example, it is assumed that UE 12 is an unmodified Rel-11 UE, which is dual-stack (DS) capable and not configured with special support for multiple APNs. Various operational aspects with regard to UE 12 and TWAG 16 will be described in the context of attach procedures/operation and detach procedures/operation For attach procedures, TWAG 16 may select two distinct APNs, one for an IPv4-only PDN connection and the other for an IPv6-only PDN connection. A subscriber profile for a subscriber associated with UE 12, may be stored in AAA element 46 can be used to identify these APNs using two new remote authentication dial in user service (RADIUS) protocol Vendor Specific Attributes (VSAs). TABLE 1, below, illustrates two possible VSAs that may be defined in 3GPP AAA element 46 to identify the APNs. When either of the two VSAs shown in TABLE 1 may be present, TWAG 16 may ignore a VSA related to default service selection, such as, for example 'Vendor-Service-Selection-APN'.

TABLE 1

Type=26/9/1
Attribute="Vendor-IPv4-Only-Service-APN"
Value=String
Description=APN providing IPv4 service
Type=26/9/1
Attribute="Vendor-IPv6-Only-Service-APN"
Value=String
Description=APN providing IPv6 service Based on receiving one or more attach triggers (e.g., DHCP version 4 (DHCPv4) and/or IPv6 neighbor discovery (ND)) for UE 12 via WLAN radio access point (AP) 14, TWAG 16 can complete signaling for a specific APN as indicated by a corresponding attach trigger. In still another embodiment, TWAG 16 can complete the signaling for both the APNs after UE attachment to WLAN radio AP 14 and TWAG 16. Accordingly, UE 12 may have an IPv4 address configuration from an IPv4-APN and an IPv6 address configuration from an IPv6-APN. Subsequently, TWAG 16 can provide application traffic forwarding/switching for UE 12. For example, TWAG 16 can forward IPv4 application traffic to IPv4-APN 50 and can forward IPv6 application traffic to IPv6-APN 60.

Solutions provided by communication system 10 can support different multi-APN configurations. As shown in FIG. 1, TWAG 16 can request an IPv4 PDN type for the S2a connection with a first APN (e.g., IPv4-APN 50) and can request an IPv6 PDN type for the S2a connection with a second APN (e.g., IPv6-APN 60). TWAG 16 may then deliver an IPv4 address (e.g., over DHCPv4 via WLAN radio AP 14) from the IPv4 PDN associated with the first APN (e.g., Internet PDN associated with IPv4-APN 50) to UE 12 and may provide UE 12 with an IPv6 prefix (e.g., over ND via WLAN radio AP 14) from the IPv6 PDN associated with the second APN (e.g., IMS PDN associated with IPv6-APN 60). In various embodiments, TWAG 16 can provide a IPv4 address from trusted non-3GPP IP access network 20 (e.g., for an NSWO) and may request an IPv6 PDN type for an S2a connection with an APN (e.g., IPv6-APN 60). TWAG 16 can then provide UE 12 with an IPv6 prefix (e.g., over ND) from the IPv6 PDN associated with the APN and can deliver the IPv4 address (e.g., over DHCPv4) associated with the NSWO to UE 12. In still other embodiments, TWAG 16 can provide an IPv6 prefix from trusted non-3GPP IP access network 20 (e.g., for an NSWO) and can request an IPv4 PDN type with an IPv4-APN (e.g., IPv4-APN 50). TWAG 16 can then deliver UE 12 an IPv6 prefix (e.g., over ND) associated with the NSWO and also with an IPv6 address (e.g., over DHCPv4) associated with the NSWO. Accordingly, UE 12 can be provided a PDN connection to access 3GPP LTE core network 40 and another connection to provide IP connectivity from trusted non-3GPP IP access network 20.

For detach procedures, any time TWAG 16 detects UE 12 loss on an access link, it can complete detach procedures for both APNs, including removing session and forwarding states for UE 12. In various embodiments, any time UE 12 performs an explicit Address Release procedure over DHCPv4 or DHCPv6, TWAG 16 can complete a PDN release procedure for the corresponding APN.

In various embodiments, any time TWAG 16 receives a binding revocation indication (BRI) from a PGW hosting an IPv4-APN (e.g., PGW 42 hosting IPv4-APN 50), TWAG 16 may release the corresponding binding update list (BUL) state and the IPv4 address configuration for any corresponding UE 12 IPv4 bindings. In some embodiments, TWAG 16 can send a DHCPv4 FORCE RENEW message to UE 12. In various embodiments, any time TWAG 16 receives a BRI from a PGW hosting an IPv6-APN (e.g., PGW 44 hosting IPv6-APN 60), TWAG 16 can release the corresponding BUL state and the IPv6 address configuration for any corresponding UE 12 IPv6 bindings. In some embodiments, TWAG 16 can send a Routing Advertisement with lifetime=0 to UE 12 to signal termination of the IPv6 bindings. Accordingly, the solution provided by communication system 10 may enable multi-APN support without Rel-12 UE changes.

In various embodiments, UE 12 can be associated with users, employees, clients, customers, etc. wishing to initiate a flow in communication system 10 via some network. The terms 'user equipment', 'mobile node', 'end user', 'user', and 'subscriber' are inclusive of devices used to initiate a communication, such as a computer, a personal digital assistant (PDA), a laptop or electronic notebook, a cellular telephone, an i-Phone™, iPad™, a Google Droid™ phone, an IP phone, or any other device, component, element, or object capable of initiating voice, audio, video, media, or data exchanges within communication system 10. UE 12 may also be inclusive of a suitable interface to a human user such as a microphone, a display, a keyboard, or other terminal equipment.

UE 12 may also be any device that seeks to initiate a communication on behalf of another entity or element such as a program, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another. In certain embodiments, UE 12 may have a bundled subscription for network access and application services (e.g., voice), etc. Once the access session is established, the user can register for application services as well, without additional authentication requirements. There can be two different user data repositories (e.g., AAA databases, whitelist databases, etc.): one for the access user profile and one for the application user profile. IP addresses can be assigned using dynamic host configuration protocol (DHCP), Stateless Address Auto-configuration, default bearer activation, etc., or any suitable variation thereof.

WLAN radio AP 14 can offer suitable connectivity to UE 12 (or any other UE that may be present in the trusted non-3GPP IP access network 20) using any appropriate protocol or technique. In general terms, WLAN radio AP 14 represents a radio access point device that can allow UE to connect to a wired network using WiFi, Bluetooth™, WiMAX, or any other appropriate standard. Hence, the broad term 'radio access point' can be inclusive of a hotspot, a WiFi array, a wireless bridge (e.g., between networks sharing same Service Set Identifier (SSID) and radio channel) or any other suitable access device, which may be capable of providing suitable connectivity to UE 12. In certain cases, the access point can connect to a router (via a wired network), which can relay data between the UE and other UE of the network.

Aside from providing session connectivity for UE connected to external PDNs (e.g., IPv4-APN 50 and IPv6-APN 60), PGWs 42, 44 may serve as policy enforcement points to manage QoS, online/offline flow-based charging, data generation, deep-packet inspection and intercept. 3GPP AAA element 46 is a network element responsible for accounting, authorization and authentication functions for UE 12 (or any other UE that may present in the network). As noted above, AAA element 46 may be configured with various subscriber-specific RADIUS VSAs to provide multi-APN support for UE 12 (or any other UE that may present in the network). For AAA considerations, AAA element 46 may provide a mobile node IP address and the accounting session identification (Acct-Session-ID) and other mobile node states in appropriate messaging (e.g., via access-Request/access-Response messages). Authentication refers to the process where an entity's identity is authenticated, typically by providing evidence that it holds a specific digital identity such as an identifier and the corresponding credentials. The authorization function determines whether a particular entity is authorized to perform a given activity, typically inherited from authentication when logging on to an application or service.

Authorization may be determined based on a range of restrictions, for example time-of-day restrictions, or physical location restrictions, or restrictions against multiple accesses by the same entity or user. Accounting refers to the tracking of network resource consumption by users for the purpose of capacity and trend analysis, cost allocation, billing, etc. In addition, it may record events such as authentication and authorization failures, and include auditing functionality, which permits verifying the correctness of procedures carried out based on accounting data. In various embodiments, communication system 10 may be provisioned with other AAA services, AAA servers, subscriber profile repositories (SPRs), combinations thereof or the like which may be used to provide AAA considerations and/or subscriber-specific RADIUS VSAs for the system.

Figure 2:
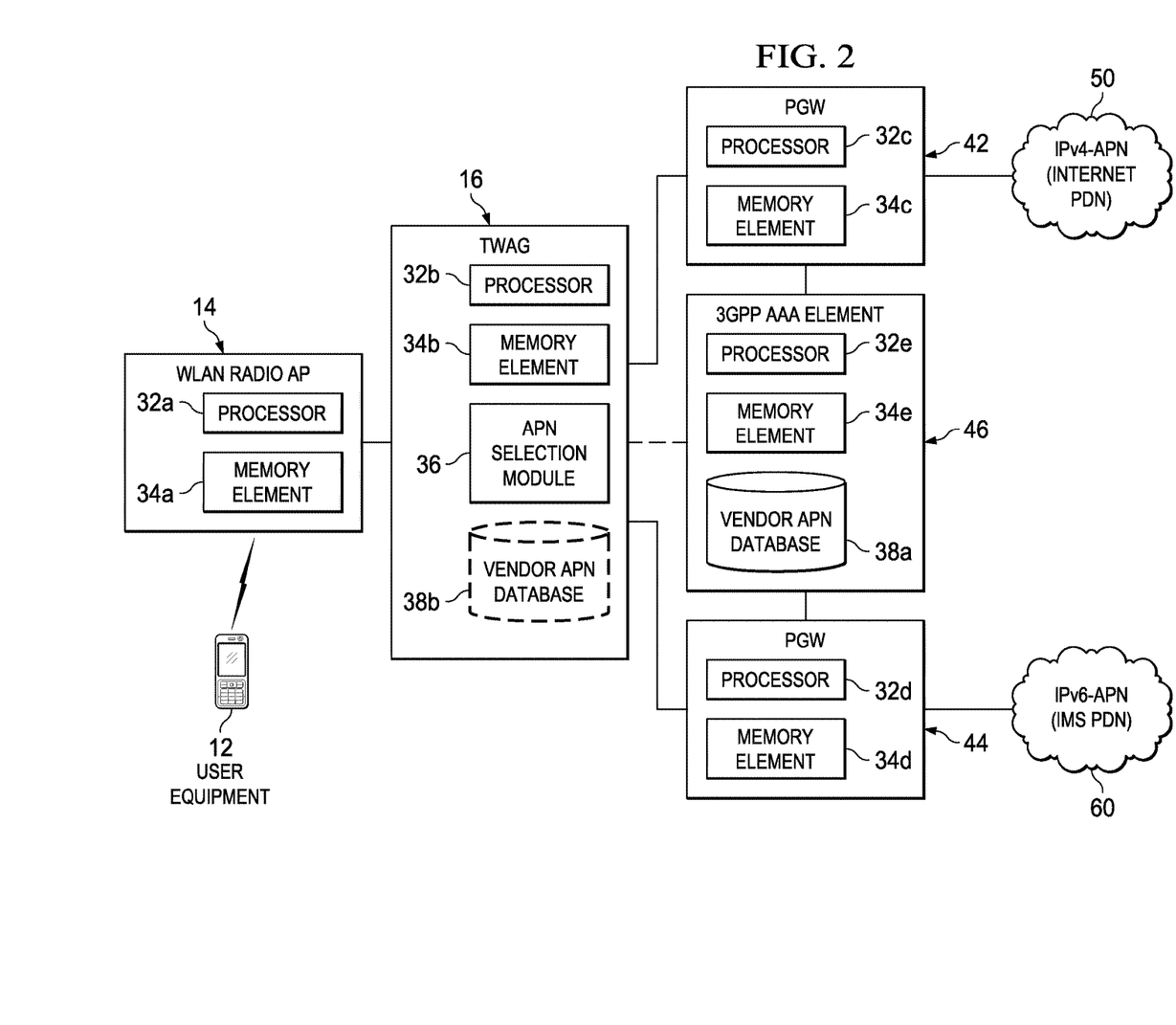
FIG. 2 is a simplified block diagram illustrating example details associated with one potential embodiment of the communication system.

Turning to FIG. 2, FIG. 2 is a simplified block diagram illustrating additional details associated with one potential embodiment of communication system 10. FIG. 2 includes WLAN radio AP 14, TWAG 16, PGWs 42, 44 and 3GPP AAA element 46 of communication system 10. Each of these elements may include a respective processor 32a-32e and a respective memory element 34a-34e. TWAG 16 may additionally include an APN selection module 36. In various embodiments, 3GPP AAA element 46 may additionally include a vendor APN database 38a, which can be used to by an equipment manufacturer and/or service provider to configure one or more RADIUS VSAs to support IP version-based multi-APN selection operations. In various embodiments, TWAG 16 can also be provided with a vendor APN database 38b. Hence, appropriate software and/or hardware is being provisioned in WLAN radio AP 14, TWAG 16, PGWs 42, 44 and 3GPP AAA element 46 in order to facilitate IP version-based multi-APN selection operations in the network environment of communication system 10. Note that in certain examples, certain databases (e.g., for storing RADIUS VSAs, subscriber information, etc.) can be consolidated with memory elements (or vice versa), or the storage can overlap/exist in any other suitable manner. UE 12, IPv6-APN 60 and IPv4-APN 50 are also shown in FIG. 2.

In one example implementation, WLAN radio AP 14, TWAG 16, PGWs 42, 44 and 3GPP AAA element 46 are network elements, which are meant to encompass network appliances, servers, routers, switches, gateways, bridges, loadbalancers, firewalls, processors, modules, or any other suitable device, component, element, or object operable to exchange information that facilitates or otherwise helps to provide for IP version-based multi-APN selection operations (e.g., for networks as illustrated in FIG. 1). In other embodiments, these operations and/or features may be provided external to these elements, or included in some other network device to achieve this intended functionality. Alternatively, one or more of these elements can include software (or reciprocating software) that can coordinate in order to achieve the operations and/or features, as outlined herein. In still other embodiments, one or more of these devices may include any suitable algorithms, hardware, software, components, modules, interfaces, or objects that facilitate the operations thereof. This may be inclusive of appropriate algorithms and communication protocols that allow for the effective exchange of data or information.

In regards to the internal structure associated with communication system 10, each of WLAN radio AP 14, TWAG 16, PGWs 42, 44 and 3GPP AAA element 46 can include memory elements for storing information to be used in achieving the IP version-based multi-APN selection activities, as outlined herein. Additionally, each of these devices may include a processor that can execute software or an algorithm to perform the IP version-based multi-APN selection activities as discussed in this Specification. These devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term 'memory element'. The information being tracked or sent to UE 12, WLAN radio AP 14, TWAG 16, PGWs 42, 44 and 3GPP AAA element 46 could be provided in any database, register, control list, cache, or storage structure: all of which can be referenced at any suitable timeframe. Any such storage options may be included within the broad term 'memory element' as used herein. Similarly, any of the potential processing elements, modules, and machines described herein should be construed as being encompassed within the broad term 'processor'. Each of the network elements and user equipment can also include suitable interfaces for receiving, transmitting, and/or otherwise communicating data or information in a network environment.

Note that in certain example implementations, the IP version-based multi-APN selection techniques as outlined herein may be implemented by logic encoded in one or more tangible media, which may be inclusive of non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements [as shown in FIG. 2] can store data or information used for the operations described herein. This includes the memory elements being able to store software, logic, code, or processor instructions that are executed to carry out the activities described herein.

A processor can execute any type of instructions associated with the data or information to achieve the operations detailed herein. In one example, the processors [as shown in FIG. 2] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), an electrically erasable PROM (EEPROM) or an ASIC that includes digital logic, software, code, electronic instructions, or any suitable combination thereof.

Figure 3:
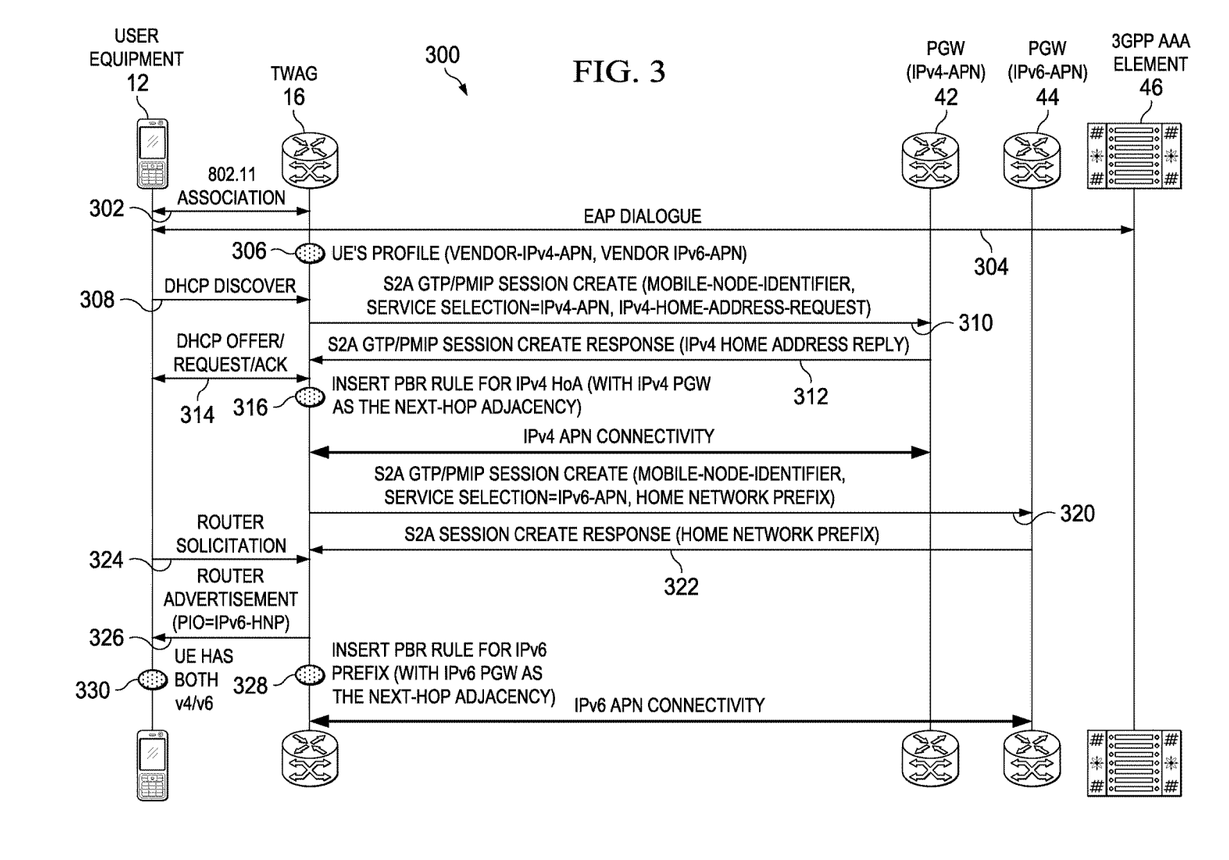
FIG. 3 is a simplified flow diagram illustrating example flows and activities associated with providing IP version-based multiple APN support in a network environment in accordance with one potential embodiment of the present disclosure.

Referring to FIG. 3, FIG. 3 is a simplified flow diagram 300 illustrating example flows and activities associated with providing IP version-based multi-APN support in a network environment; specifically, for one or more attach operations for UE 12, in accordance with one potential embodiment of the present disclosure. In FIG. 3, the flows of data and activities represented show the flow of data between the components and activities performed by certain components within communication system 10 as shown in FIG. 1 including UE 12, TWAG 16, PGW 42 (hosting IPv4-APN 50), PGW 44 (hosting IPv6-APN 60) and 3GPP AAA element 46.

As shown in FIG. 3, processing may start at 302 when an 802.11 association is established between UE 12 and TWAG 16. Note it should be understood that the 802.11 association may be established with TWAG 16 via WLAN radio AP 14; however, WLAN radio AP 14 is not shown in FIG. 3 for purposes of illustrating other features of communication system 10. At 304, an Extensible Authorization Protocol (EAP) dialogue may be exchanged between UE 12 and 3GPP AAA element 46. In various embodiments, the EAP dialogue can include an EAP subscriber identity module (EAP-SIM) or an EAP authentication and key agreement (EAP-AKA) authentication to initiate a session for the UE, which may allow AAA element 46 to authenticate an identity for a subscriber associated with UE 12 and, in cases where that identity may be a temporary identity (e.g., a pseudonym), to associate that temporary identity with a permanent identity such as an International Mobile Subscriber Identity (IMSI) for the user associated with UE 12.

At 306, TWAG 16 may load a subscriber profile for UE 12, which can include, for example, a RADIUS-based 'Vendor-IPv4-APN' VSA and a 'Vendor-IPv6-APN' VSA for the subscriber associated with UE 12. In various embodiments, TWAG 16 may load the subscriber profile for UE 12 based on the EAP exchange with 3GPP AAA element 46. For example, the subscriber profile can be 'piggybacked' onto the RADIUS message carrying the EAP Success message. In various embodiments, the subscriber profile can also be loaded based on a separate exchange between TWAG 16 and 3GPP AAA element 46.

At 308, UE 12 may communicate a DHCP discover message (e.g., a DHCPv4 discover message) to TWAG 16. The DHCP discover message may represent an attach trigger received by TWAG 16. Note although a DHCP discover message is shown in FIG. 3 as an attach trigger, it should be understood that the attach trigger could also be an IPv6 ND message communicated from UE 12 to TWAG 16, in which case the order of operations described for the remainder of FIG. 3 could be switched, for example, with the flows for establishing IPv6 connectivity with IPv6-APN 60 occurring before the flows for establishing connectivity with IPv4-APN 50. The order of establishing IPv4 and IPv6 connectivity as shown in FIG. 3 is provided for illustrative purposes only and is not meant to limit the broad scope of the present disclosure.

Returning to FIG. 3, TWAG 16 can use the profile for UE 12 to determine the appropriate PGWs hosting the IPv4-APN (or NSWO, depending on configuration) and IPv6-APN associated with UE 12 and at 310, TWAG 16 can communicate an S2a session create message to PGW 42 (hosting IPv4-APN 50). The message can be communicated using GTP or PMIP, depending on configuration, and can include a mobile node identifier for UE 12, a service selection corresponding to IPv4-APN 50 (e.g., as indicated by the IPv4 VSA for UE 12) and an IPv4 home address request.

At 312, PGW 42 may respond with an S2a (GTP or PMIP) session create response of an IPv4 home address (HoA) reply type including the IPv4 HoA. At 314, a DHCP Offer/Request/Acknowledgement exchange may occur between TWAG 16 and UE 12 in which TWAG 16 may provide UE 12 with the IPv4 HoA for IPv4-APN 50. At 316, TWAG 16 may insert (e.g., store) a policy based routing (PBR) rule for the IPv4 HoA with IPv4 PGW 42 as the next-hop adjacency in order to appropriately forward IPv4 traffic between UE 12 and PGW 42. Thus, IPv4 connectivity can be maintained between TWAG 16 and PGW 42 until one or more detach events may occur (e.g., loss of UE 12 access link, UE 12 performs an explicit Address Release procedure over DHCPv4, TWAG 16 receives a BRI from PGW 42, etc.).

At 320, TWAG 16 can communicate an S2a session create message to PGW 44 (hosting IPv6-APN 60). The message can be communicated using GTP or PMIP, depending on configuration, and can include a mobile node identifier for UE 12, a service selection corresponding to IPv6-APN 60 (e.g., as indicated by the IPv6 VSA for UE 12) and an IPv6 home network prefix (HNP) request. At 322, PGW 44 may respond with an S2a (GTP or PMIP) session create response including the IPv6 home network prefix corresponding to IPv6-APN 60. At 324, UE 12 may communicate a router solicitation to TWAG 16 requesting the IPv6 HNP and at 326 TWAG 16 may communicate an RA to UE 12 having a prefix information option (PIO) set to the IPv6 HNP for IPv6-APN 60. At 328, TWAG 16 may insert (e.g., store) a PBR rule for the IPv6 HNP with IPv6 PGW 44 as the next-hop adjacency in order to appropriately forward IPv6 traffic between UE 12 and PGW 44. Thus, IPv6 connectivity can maintained between TWAG 16 and PGW 42 until one or more detach events may occur (e.g., loss of UE 12 access link, UE 12 performs an explicit Address Release procedure over DHCPv6, TWAG 16 receives a BRI from PGW 44, etc.). As shown at 330, UE 12 has been provided with both the IPv4 HoA for IPv4-APN 50 and the IPv6 HNP for IPv6-APN 60. Accordingly, TWAG 16 can switch traffic between IPv4-APN 50 and IPv6-APN 60 based on the IP version type of UE 12 traffic.

Figure 4A:
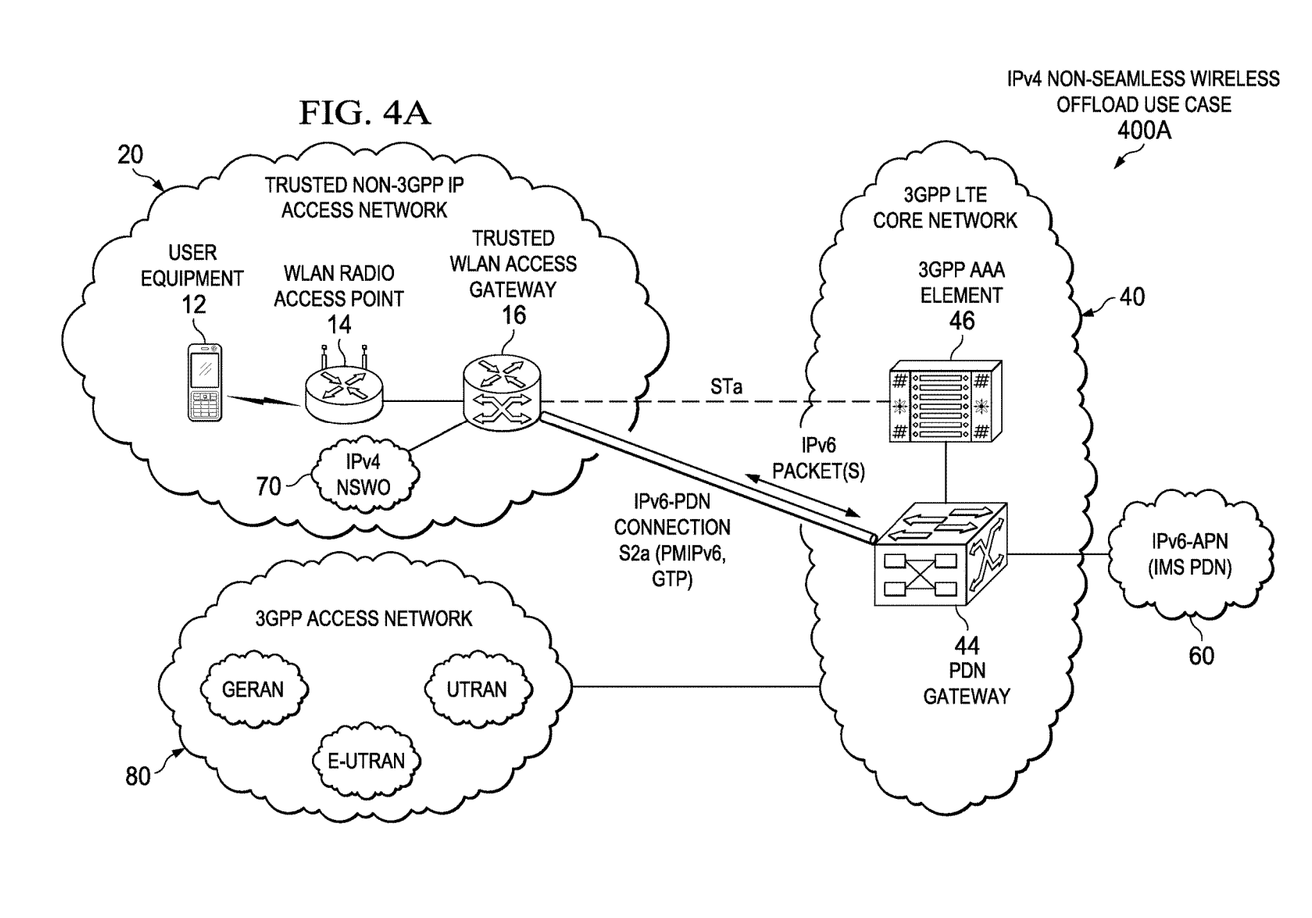
FIGS. 4A-4B are simplified block diagrams illustrating example details associated with non-seamless wireless offload (NSWO) use cases in accordance with various embodiments of the present disclosure.
Figure 4B:
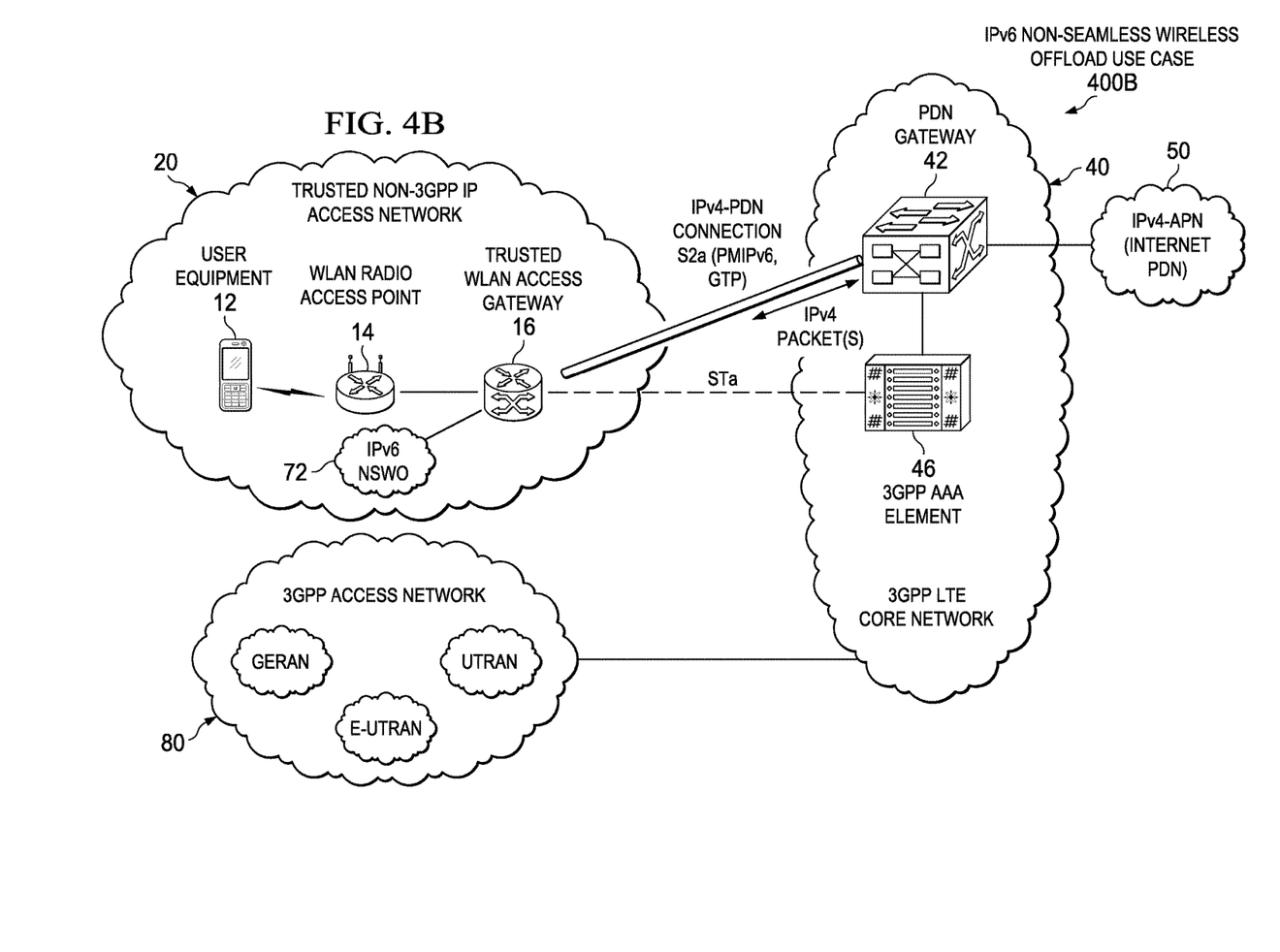

Referring to FIGS. 4A-4B, FIGS. 4A-4B are simplified block diagram illustrating example details associated with NSWO use cases 400A-400B in accordance with various embodiments of the present disclosure. FIG. 4A illustrates an IPv4 NSWO use case 400A and FIG. 4B illustrates an IPv6 NSWO use case 400B. FIG. 4A includes UE 12; trusted non-3GPP IP access network 20 including WLAN radio AP 14, TWAG 16 and an IPv4 NSWO 70; 3GPP LTE core network 40 including PDN gateway (PGW) 44 and 3GPP AAA element 46 and 3GPP access network 80. PGW 44 can interface with IPv6-APN 60 (e.g., an IMS PDN).

As shown in FIG. 4A, TWAG 16 can support selection of IPv6-APN 60 and IPv4 NSWO 70. During operation, TWAG 16, upon receiving an attach trigger from UE 12, can establish S2a IPv6 connectivity (using either PMIP or GTP, depending on configuration) with IPv6-APN 60 (e.g., requesting an IPv6 prefix) for an S2a connection between TWAG 16 and PGW 44 for IPv6 traffic for UE 12. TWAG 16 can also provide an IPv4 address from trusted non-3GPP IP access network 20 (e.g., a local IPv4 address) for IPv4 NSWO 70 to establish a connection with IPv4 NSWO 70. TWAG 16 can provide UE 12 (e.g., over ND) with the IPv6 prefix for IPv6-APN 60 and can deliver the IPv4 address (e.g., over DHCPv4) associated with the IPv4 NSWO 70 connection.

Turning to FIG. 4B, FIG. 4B includes UE 12; trusted non-3GPP IP access network 20 including WLAN radio AP 14, TWAG 16 and IPv6 NSWO 72; 3GPP LTE core network 40 including PDN gateway (PGW) 42 and 3GPP AAA element 46 and 3GPP access network 80. PGW 42 can interface with IPv4-APN 50 (e.g., an internet PDN).

As shown in FIG. 4B, TWAG 16 can support selection of IPv4-APN 50 and IPv6 NSWO 72. During operation, TWAG 16, upon receiving an attach trigger from UE 12 can establish S2a IPv4 connectivity with IPv4-APN 50 via PGW 42 for IPv4 traffic for UE 12. TWAG 16 can also provide an IPv6 address from trusted non-3GPP IP access network 20 (e.g., a local IPv6 address) for IPv6 NSWO 72 to establish a connection with IPv6 NSWO 72. TWAG 16 can provide UE 12 with the IPv4 address for IPv4-APN 50 and can deliver the IPv6 prefix for IPv6 NSWO 72. Thus, as shown in FIGS. 4A-4B, TWAG 16 can, in various embodiments, support switching traffic between an IPv4 NSWO for non-3GPP IP connectivity and an IPv6-APN for 3GPP connectivity based on the IP version type of UE traffic and can support switching traffic between an IPv6 NSWO for non-3GPP IP connectivity and an IPv4-APN for 3GPP connectivity.

Figure 5:
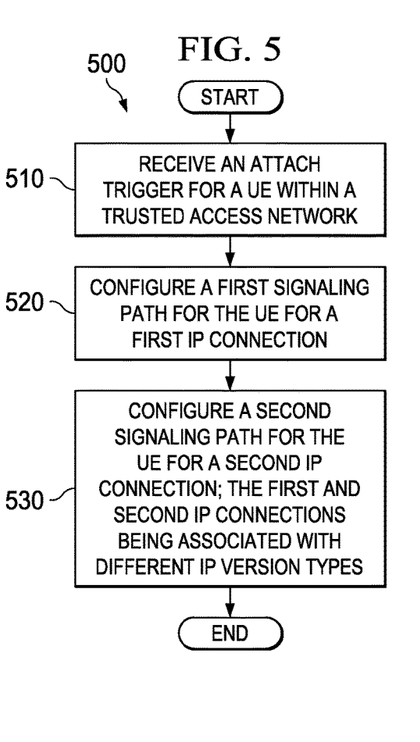
FIG. 5 is a simplified flow diagram illustrating example operations associated with one embodiment of the present disclosure.

Referring to FIG. 5, FIG. 5 is a simplified flow diagram 500 illustrating example operations associated with one embodiment of communication system 10. In various embodiments, the operations may be perform by components within communication system 10 including UE 12, WLAN radio AP 14, TWAG 16, 3GPP AAA element 46, and PGWs 42, 44. At any time, TWAG 16 may receive an attach trigger for a given UE (e.g., UE 12) following an EAP dialogue for the UE via 3GPP AAA element 46. Thus, processing may start at 510, when TWAG 16 may receive an attach trigger for UE 12 within a trusted access network (e.g., trusted non-3GPP IP access network 20). In various embodiments, the attach trigger can include a DHCPv4 discover or IPv6 ND and may be received by TWAG 16 via WLAN radio access point 14 from UE 12.

At 520, TWAG 16 may configure a first signaling path for the UE for a first IP connection. In various embodiments, configuring the first signaling path can include creating a connection for the UE via an S2a signaling interface with a first PGW (e.g., PGW 42) for a first PDN or creating an NSWO connection. At 530, TWAG 16 may configure a second signaling path for the UE for a second IP connection; the first and second IP connections can be associated with different IP version types. In various embodiments, configuring the second signaling path can include creating another connection for the UE via another S2a signaling interface with another PGW (e.g., PGW 44) for a second PDN connection or creating an NSWO connection. In various embodiments, the first or the second IP connections can be configured for IPv4-PDN connections, IPv6-PDN connections IPv4 NSWO connections or IPv6 NSWO connections.

Figure 6:
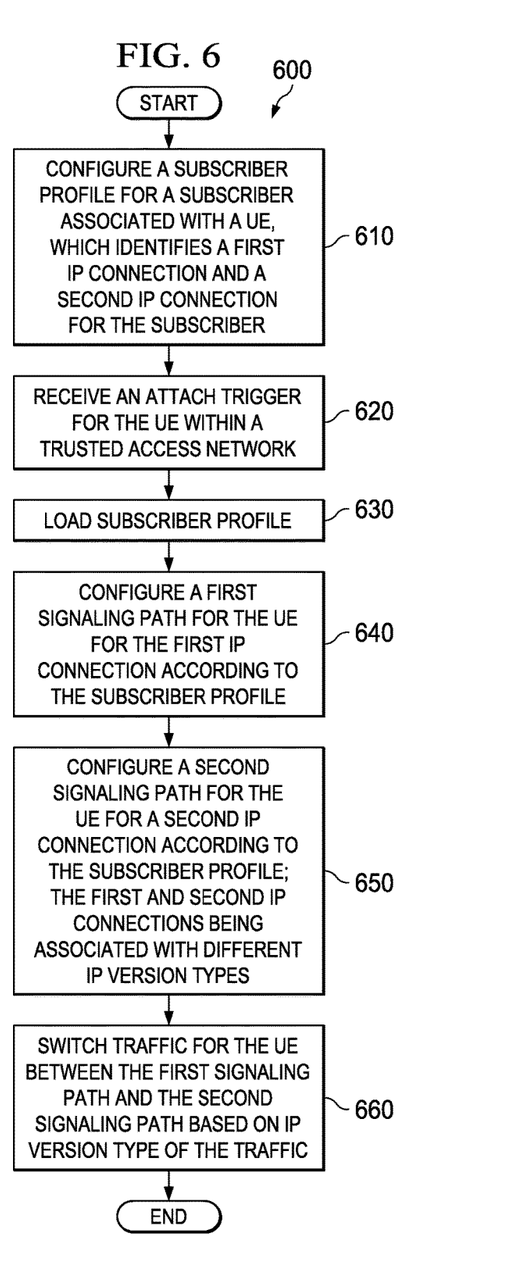
FIG. 6 is a simplified flow diagram illustrating other example operations associated with one embodiment of the present disclosure.

Referring to FIG. 6, FIG. 6 is a simplified flow diagram 600 illustrating other example operations associated with one embodiment of communication system 10. In various embodiments, the operations may be perform by components within communication system 10 including UE 12, WLAN radio AP 14, TWAG 16, 3GPP AAA element 46, and PGWs 42, 44. Processing may start at 610, when a subscriber profile may be configured for a subscriber associated with a given UE (e.g., UE 12), which may identify a first IP connection and a second IP connection for the subscriber. In various embodiments, the subscriber profile can be configured for 3GPP AAA element 46, a subscriber profile repository (SPR) combinations thereof or the like using one or more RADIUS-based VSAs (e.g., a 'Vendor-IPv4-APN' VSA and a 'Vendor-IPv6-APN' VSA).

At any time, TWAG 16 may receive an attach trigger for a given UE (e.g., UE 12) following an EAP dialogue for the UE via 3GPP AAA element 46. Thus, processing may continue at 620, when TWAG 16 may receive an attach trigger for UE 12 within a trusted access network (e.g., trusted non-3GPP IP access network 20). In various embodiments, the attach trigger can include a DHCPv4 discover or IPv6 ND and may be received by TWAG 16 via WLAN radio access point 14 from UE 12. At 630, TWAG 16 may load the subscriber profile for the subscriber associated with UE 12 from 3GPP AAA element 46.

At 640, TWAG 16 may configure a first signaling path for the UE for a first IP connection. Configuring the first signaling path can include creating a connection for the UE via an S2a signaling interface with a first PGW (e.g., PGW 42) or creating an NSWO connection. At 650, TWAG 16 may configure a second signaling path for the UE for a second IP connection; the first and second IP connections can be associated with different IP version types. Configuring the second signaling path can include creating another connection for the UE via another S2a signaling interface with another PGW (e.g., PGW 44) or with an NSWO. In various embodiments, the first or the second IP connections can be configured for IPv4-PDN connections, IPv6-PDN connections IPv4 NSWO connections or IPv6 NSWO connections. At 660, TWAG 16 may switch traffic for the UE between the first signaling path configured for the first IP connection and the second signaling path configured for the second IP connection based on IP version type of the traffic.

In various embodiments, the trusted non-3GPP IP access network 20 (as shown in FIGS. 1 and 4A-4B) represents a series of points or nodes of interconnected communication paths for receiving and transmitting packets of information that propagate through the architecture. The network can offer a communicative interface between sources and/or hosts, and each may be any local area network (LAN), metropolitan area network (MAN), Intranet, Extranet, wide area network (WAN), virtual private network (VPN), or any other appropriate architecture or system that facilitates communications in a network environment.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the steps in the appended diagrams illustrate only some of the possible signaling scenarios and patterns that may be executed by, or within, communication system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding flows and activities have been offered for purposes of example and discussion. Substantial flexibility is provided by communication system 10 in that any suitable arrangements, chronologies, configurations, and timing mechanisms may be provided without departing from the teachings provided herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words 'means for' or 'step for' are specifically used in the particular claims; and (b) does not intend, by any statement in the specification, to limit this disclosure in any way that is not otherwise reflected in the appended claims.

What is claimed is:

1. A method for a communication network comprising:
    receiving one attach trigger for a user equipment (UE) within a trusted access network, wherein the UE is dual stack capable device; and
    configuring, in response to receiving the one attach trigger at a Trusted Wireless Local Area Network Access Gateway (TWAG) in the trusted access network:
        a first signaling path for the UE for a first Internet protocol (IP) connection that is configured for a first IP version type; and
        a second signaling path for the UE for a second IP connection that is configured for a second IP version type different from the first IP version type; and
    in response to detecting one detach event between the UE and the TWAG, completing detach procedures for both the first signaling path and the second signaling path.

2. The method of claim 1, wherein the first IP connection is associated with a first packet data network (PDN) connection for a first access point name (APN) and the second IP connection is associated with a second PDN connection for a second APN.

3. The method of claim 2, wherein the first signaling path or the second signaling path is configured for at least one of:
    an IP version 4 (IPv4) packet data network (PDN) connection using an S2a signaling interface; and
    an IP version 6 (IPv6) PDN connection using another S2a signaling interface.

4. The method of claim 1, wherein the first IP connection is associated with an IP version 4 (IPv4) non-seamless wireless offload (NSWO) connection within the trusted access network and the second IP connection is associated with an IP version 6 (IPv6) packet data network (PDN) connection via a 3rd Generation Partnership Project (3GPP) network with an IPv6 access point name (APN).

5. The method of claim 1, wherein the first IP connection is associated with an IP version 6 (IPv6) non-seamless wireless offload (NSWO) connection within the trusted access network and the second IP connection is associated with an IP version 4 (IPv4) packet data network (PDN) connection via a 3rd Generation Partnership Project (3GPP) network with an IPv4 access point name (APN).

6. The method of claim 1, further comprising:
    configuring a subscriber profile for a subscriber associated with the UE, which identifies the first IP connection and the second IP connection for the subscriber; and
    loading the subscriber profile for the subscriber upon receiving the one attach trigger for the UE.

7. The method of claim 1, further comprising:
    switching traffic for the UE between the first signaling path configured for the first IP connection and the second signaling path configured for the second IP connection based on IP version type of the traffic.

8. One or more non-transitory tangible media encoding logic that include instructions for execution that, when executed by a processor, is operable to perform operations comprising:
    receiving one attach trigger for a user equipment (UE) that is dual stack capable within a trusted access network;
    in response to receiving the one attach trigger, concurrently configuring, at a Trusted Wireless Local Area Network Access Gateway (TWAG) in the trusted access network:
        a first signaling path for the UE for a first Internet protocol (IP) connection that is configured for a first IP version type; and
        a second IP connection that is configured for a second IP version type different from the first IP version type; and
    in response to detecting one detach event between the UE and the TWAG, completing detach procedures for both the first signaling path and the second signaling path.

9. The media of claim 8, wherein the first IP connection is associated with a first packet data network (PDN) for a first access point name (APN) and the second IP connection is associated with a second PDN for a second APN.

10. The media of claim 8, wherein the first signaling path or the second signaling path is configured for at least one of:
   an IP version 4 (IPv4) packet data network (PDN) connection using an S2a signaling interface; and
   an IP version 6 (IPv6) PDN connection using another S2a signaling interface.

11. The media of claim 8, wherein the first IP connection is associated with an IP version 4 (IPv4) non-seamless wireless offload (NSWO) connection within the trusted access network and the second IP connection is associated with an IP version 6 (IPv6) packet data network (PDN) connection via a 3rd Generation Partnership Project (3GPP) network with an IPv6 access point name (APN).

12. The media of claim 8, wherein the first IP connection is associated with an IP version 6 (IPv6) non-seamless wireless offload (NSWO) connection within the trusted access network and the second IP connection is associated with an IP version 4 (IPv4) packet data network (PDN) connection via a 3rd Generation Partnership Project (3GPP) network with an IPv4 access point name (APN).

13. The media of claim 8, the operations further comprising:
   configuring a subscriber profile for a subscriber associated with the UE, which identifies the first IP connection and the second IP connection for the subscriber; and
   loading the subscriber profile for the subscriber upon receiving the one attach trigger for the UE.

14. The media of claim 8, the operations further comprising:
   switching traffic for the UE between the first signaling path configured for the first IP connection and the second signaling path configured for the second IP connection based on IP version type of the traffic.

15. An apparatus, comprising:
   a memory element for storing data; and
   a processor that executes instructions associated with the data, wherein the processor and memory element cooperate such that the apparatus is configured for:
      receiving one attach trigger for a user equipment (UE) that is a dual stack device within a trusted access network;
      in response to receiving the one attach trigger, configuring, at a Trusted Wireless Local Area Network Access Gateway (TWAG) in the trusted access network:
         a first signaling path for the UE for a first Internet protocol (IP) connection configured for IP version 4 (IPv4); and
         a second signaling path for the UE for a second IP connection configured for IP version 6 (IPv6); and
      in response to detecting one detach event between the UE and the TWAG, completing detach procedures for both the first signaling path and the second signaling path.

16. The apparatus of claim 15, wherein the first IP connection is associated with a first packet data network (PDN) connection for a first access point name (APN) and the second IP connection is associated with a second PDN connection for a second APN.

17. The apparatus of claim 15, wherein the first signaling path or the second signaling path is configured for a packet data network (PDN) connection using an S2a signaling interface.

18. The apparatus of claim 15, wherein the first IP connection is associated with an IPv4 non-seamless wireless offload (NSWO) connection within the trusted access network and the second IP connection is associated with an IPv6 packet data network (PDN) connection via a 3rd Generation Partnership Project (3GPP) network with an IPv6 access point name (APN).

19. The apparatus of claim 15, wherein the second IP connection is associated with an IPv6 non-seamless wireless offload (NSWO) connection within the trusted access network and the first IP connection is associated with an IPv4 packet data network (PDN) connection via a 3rd Generation Partnership Project (3GPP) network with an IPv4 access point name (APN).

20. The apparatus of claim 15, wherein the apparatus is further configured for:
   switching traffic for the UE between the first signaling path configured for the first IP connection and the second signaling path configured for the second IP connection based on IP version type of the traffic.

* * * * *